Feb. 13, 1934.  M. KASSAY  1,947,397
WOOD SAWING MACHINE
Filed April 6, 1933  2 Sheets-Sheet 1

Inventor
Martin Kassay.
By
Bryant & Lowry
Attorneys

Feb. 13, 1934.                    M. KASSAY                    1,947,397
                             WOOD SAWING MACHINE
                            Filed April 6, 1933            2 Sheets-Sheet 2
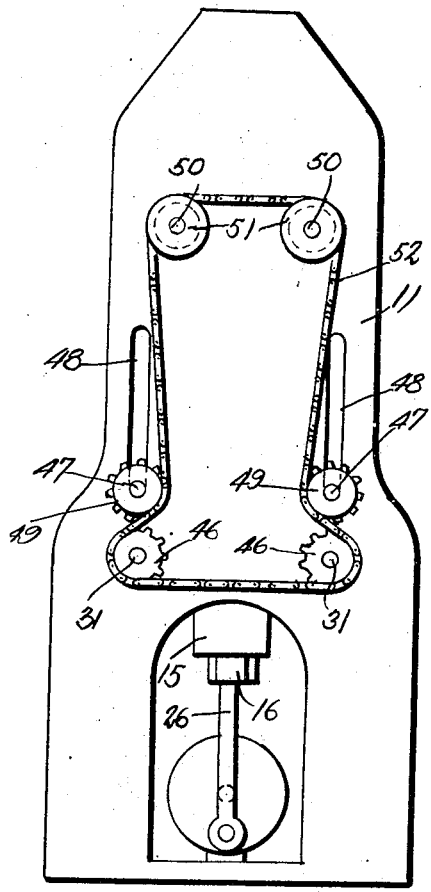
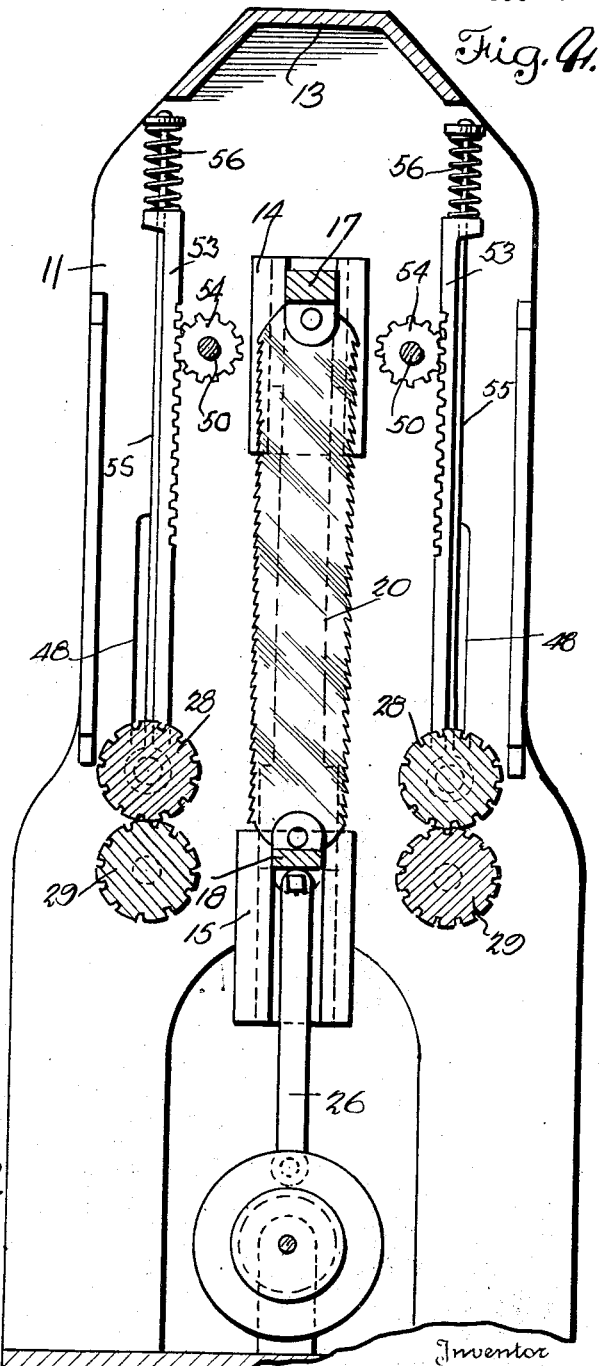
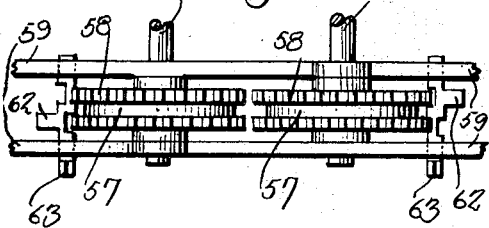

Patented Feb. 13, 1934

1,947,397

UNITED STATES PATENT OFFICE 1,947,397

WOOD SAWING MACHINE

Martin Kassay, Tarentum, Pa., assignor of one-half to Edward Cimbora, Avoca, N. Y.

Application April 6, 1933. Serial No. 664,825

1 Claim. (Cl. 143—84)

This invention relates to certain new and useful improvements in wood sawing machines.

The primary object of the invention is to provide a wood sawing machine wherein a reciprocating frame carrying a saw blade is motor operated with positively driven guide rollers for the work having the operating means therefor of the reversible type whereby work may be fed into the machine from either side thereof.

A further object of the invention is to provide a wood sawing machine of the foregoing character wherein the upper feed and delivery guide rollers for the work are resiliently and adjustably mounted to compensate for work of different thicknesses fed to and delivered from the saw machine.

It is a further object of the invention to provide a novel arrangement for accomplishing adjustment of the upper feed and work delivery guide rollers whereby accurate and quick adjustment of the rollers is possible.

With the above and other objects in view that will become apparent as the nature of the invention is better understood, the same consists in the novel form, combination and arrangement of parts hereinafter more fully described, shown in the accompanying drawings and claimed.

In the drawings:—

Figure 3 is an opposite end elevational view showing the drive connection between the upper and lower work feed rollers;

Figure 4 is a vertical cross-sectional view taken on line 4—4 of Figure 2, showing the tensioned rack bars for the support of the upper adjustable work feed rollers;

Figure 6 is a fragmentary top plan view of the adjusting devices for the upper work feed rollers; and Figure 7 is a perspective view of one of the pawl devices of the guide roller adjusting mechanism.

Figure 1:
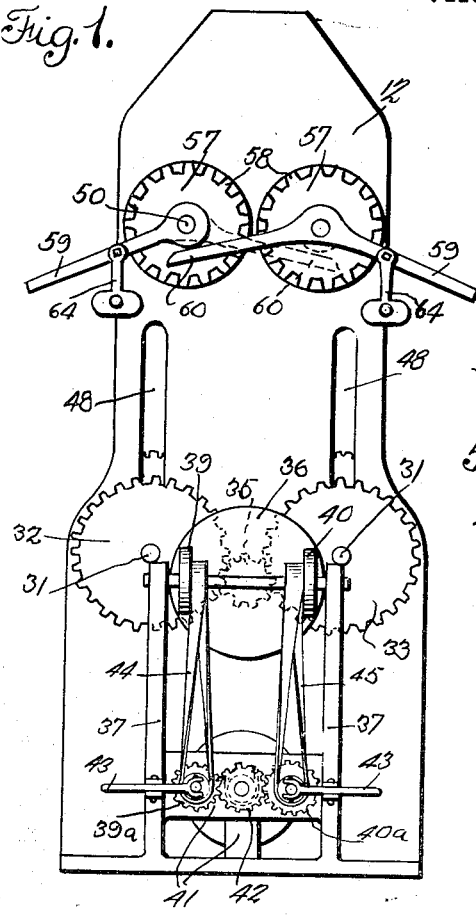
Figure 1 is an end elevational view of a wood sawing machine constructed in accordance with the present invention, showing the reversible driving means for the work feed rollers and the adjusting means for the upper guide rollers.

Referring more in detail to the accompanying drawings, there is illustrated a wood sawing machine comprising a frame structure having a base plate 10 and a pair of spaced parallel upright walls 11 and 12 rising therefrom with a cross connecting head rail 13 at their upper ends. A vertically reciprocable saw and carrying frame therefor are mounted between the side walls 11 and 12 by means of pairs of upper and lower guide blocks 14 and 15 respectively secured to the inner faces of the walls 11 and 12, the saw supporting frame being of rectangular form and including side rails 16, a cross head rail 17 and a cross base rail 18. The cross rails 17 and 18 are fashioned as at 19 for the detachable support of a saw blade 20 disposed midway the ends of the cross rails 17 and 18. An inter-fitting rib and slot connection 21 is provided between the upper and lower ends of the side rails 16 of the saw supporting frame and the guide blocks 14 and 15, for retaining the supporting frame in proper position relative to the guide blocks.

The operating means for the saw supporting frame includes a driven shaft 22 journalled in the bearing 23 rising from the base plate 10 and also in the side wall 12, the shaft 22 projecting outwardly of the bearing 23 and side wall 12 and having fixed thereon between said bearing and side wall, a pulley 24 adapted to have a belt or other connection with a drive motor. The end of the shaft 22 inwardly of the bearing 23 carries a disk 25 that has an eccentric rod connection 26 with the base rail 18 of the saw supporting frame as shown at 27 for effecting reciprocating movement of the saw supporting frame upon rotation of the shaft 22.

Pairs of work feed and guide rollers are journalled in the side walls 11 and 12 for directing work to the saw blade 20, the feed rollers of each pair being positively driven and provision is made for reversing the direction of rotation of the feed rollers so that work may be fed to the saw from either side of the frame structure. A pair of feed rollers is arranged at each side of the saw supporting frame with the two pairs horizontally aligned and each pair includes vertically aligned rollers 28 and 29 circumferentially notched as at 30 with the sections of the rollers between the notches longitudinally ribbed to increase gripping engagement with the work fed to the saw. The bearing shaft 31 for the lower rollers 29 have bearings in the side wall 12 and project therethrough to have gear wheels 32 and 33 respectively secured thereto. A stub shaft 34 is journaled in the wall 12 between the gears 32 and 33 and carries a pinion 35 meshing with the two gears 32 and 33, the pinion 35 being in communication with the driven shaft 22 by means of devices including a friction disk 36 secured to the outer end of the stub shaft 34. The communicating devices further include a pair of standards 37 rising from the base plate 10 outwardly of the wall 12 and supporting at their upper ends, a shaft 38 upon which a pair of friction wheels 39 and 40 are mounted and respectively engaged with the friction disk 36 at opposite sides of the center thereof for effecting reverse rotation of the disk 36 and pinion 35 with the gear wheels 32 and 33 for reversely rotating the lower feed rollers 29. The outer projecting end of the driven shaft 22 has a bearing in the frame 41 positioned between the standards 37 and said shaft end has a gear wheel 42 and with which laterally positioned gears 39a and 40a are selectively engageable by means of operating levers 43 supported on the standards 37. The lateral gears 39a and 40a respectively have belt connections 44 and 45 with the friction wheels 39 and 40 for the operation of the friction disk 36 in the desired direction of rotative movement.

Figure 2:
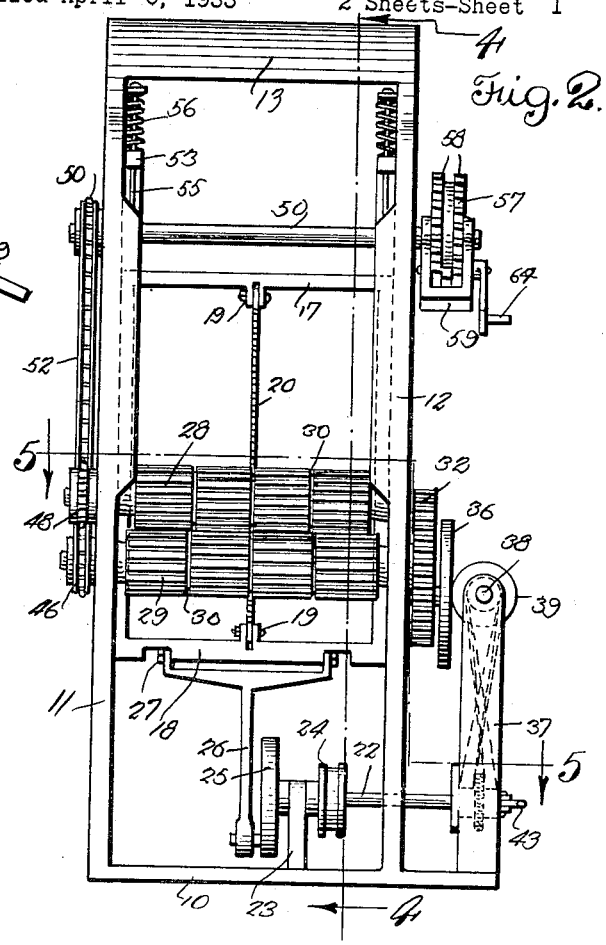
Figure 2 is a side elevational view showing the reciprocating frame carrying the saw and the operating means therefor.
Figure 5:
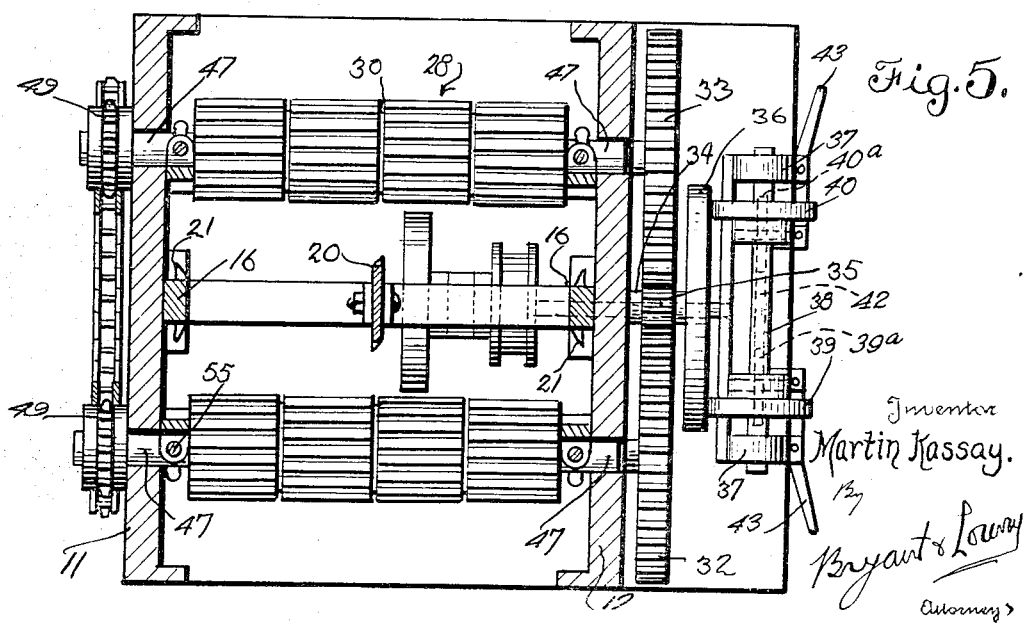
Figure 5 is a horizontal sectional view taken on line 5—5 of Figure 2.

A driving connection is established between the lower feed rollers 29 and the upper feed rollers 28 and as shown in Figures 2, 3 and 5, the ends of the shafts 31 projecting through the wall 11 have sprocket wheels 46 keyed thereto. The shaft 47 supporting the upper feed rollers 28 have opposite ends thereof extending into vertical slots 48 provided in the walls 11 and 12, the ends of the shafts 47 projecting through the slots in the wall 11 and having sprocket wheels 49 keyed to the projecting ends. A pair of shafts 50 is journalled in the walls 11 and 12 adjacent their upper ends laterally of the upper guide block 14 for the saw supporting frame with the ends thereof projecting through the wall 11 carrying sheaths or grooved pulleys 51. A sprocket chain 52 passes over the sprocket wheels 46 and 49 and the loose guide pulleys 51, the sprocket chain communicating rotary motion of the lower feed rollers 29 to the upper feed rollers 28. The upper feed rollers 28 are resiliently and adjustably supported to permit work of different thicknesses being fed by the rollers to the saw, the supporting devices for the upper feed rollers including a rack bar 53 for each end of the shafts 47 adjacent the inner sides of the walls 11 and 12 and engaged by a pinion 54 fixed to each end of an adjacent shaft 50. A rod 55 is slidably carried by each rack bar 53, the lower end thereof extending below the rack bar and having an eye at its lower end through which the shaft rotatably extends and providing a support for the rack bar and rod. The upper end of the rod 55 extends above the upper end of the rack bar and has a coil spring 56 thereon interposed between the upper end of the rack bar and the upper end of the rod 55 for applying tension to the shaft 47 irrespective of the vertically adjusted position assumed by the rack bar 53. The shafts 50 are unaffected by movements of the sprocket chain 52 over the guide pulleys 51 and said shafts 50 are adapted to be rotated by a pawl and gear mechanism for operating the pinions 54 to elevate the rack bars 53 and the tensioned upper feed roller supporting rods 55 for varying the distance between the upper and lower feed rollers 28 and 29. The devices for effecting rotation of the shafts 50 include a gear wheel 57 secured to the ends of the shafts 50 projecting outwardly of the wall 12, each gear wheel 57 carrying two circumferential rows of gear teeth 58 respectively staggered. A U-shaped frame 59 constituting an operating handle is journalled on each shaft 50 and carries an arm 60 extending therefrom to be engaged with the underside of the other shaft 50 which acts as an abutment stop therefor. A dog or pawl 61 is journalled in the side bars of the U-shaped frame lever 59 and carries a pair of offset oppositely extending dogs or lugs 62 respectively engaged with the staggered gear teeth 58 of the associated gear wheel 57, one end of the pawl 61 being provided with a key formation 63 for the attachment of the weighted operating crank 64 that retains the parts in adjusted position. With the pawl 60 having one of its lugs engaged with the toothed portion 58 of the gear wheel 57 and the arm extension 60 of the frame carrying said pawl engaged with the opposite shaft 50, rotation of the shaft is prevented and the pinion 54 maintains the rack bar 53 in its vertically adjusted position with the upper roller 28 resiliently supported by the tensioned rod 55. The shafts 50 are rotated by means of the pawls 61 engaged with the gear wheels 57 for varying the distance between the feed rollers 28 and 29 to compensate for work of different thicknesses being fed to the saw 20. The upper feed roller 28 may be manually elevated by the frame lever 59 to start work between the feed rollers and varying thicknesses of the work are compensated for by the resilient support for the upper feed roller.

From the above detailed description of the invention, it is believed that the construction and operation thereof will at once be apparent, it being noted that by the reversing mechanism forming a part of the driving devices, either set of feed rollers at opposite sides of the main frame may be driven in a direction to feed the work to the saw, the latter as illustrated in Figure 4 being shown as double edged, and while there is herein shown and described the preferred embodiment of the invention, it is nevertheless to be understood that minor changes may be made therein without departing from the spirit and scope of the invention as claimed.

I claim:—

In a wood sawing machine, a frame, a saw vertically reciprocable therein, a pair of work-guide feed rollers at each side of the frame, means for reciprocating the saw and rotating the feed rollers, vertically adjustable means for the upper feed roller of each pair including a vertical rack bar adjacent each end of the upper rollers, a tensioned rod slidable on the rack bar and supporting the rollers and a cross-shaft adjacent each pair of rack bars, a pinion on each end of the shafts engageable with a rack bar, a lever pivoted on each shaft and having an extension abuttingly engaging the opposite shaft, a gear on each shaft adjacent a lever and a manually operable pawl on each lever engageable with the associated gear for rotating the shafts and pinions for raising the rack bars and rollers.

MARTIN KASSAY.